United States Patent [19]

Foster

[11] 3,877,726
[45] Apr. 15, 1975

[54] BICYCLE SUPPORT STAND

[76] Inventor: Edwin E. Foster, 1801 Camp Craft Rd., Austin, Tex. 78767

[22] Filed: Feb. 26, 1973

[21] Appl. No.: 335,699

[52] U.S. Cl. ............................. 280/294; 74/594.6
[51] Int. Cl. ............................................ B62h 1/08
[58] Field of Search ...... 280/294; 74/560, 561, 562, 74/563, 594.4, 594.5, 594.6

[56] References Cited
UNITED STATES PATENTS

| 544,223 | 8/1895 | Hart, Jr. | 280/294 |
| 589,988 | 9/1897 | Young | 74/594.6 |
| 639,132 | 12/1899 | Avery | 74/594.6 |
| 643,896 | 2/1900 | Goldsmith | 74/594.5 |
| 644,074 | 2/1900 | Hart, Jr. | 280/294 |
| 666,996 | 1/1901 | Baldwin | 74/594.6 |
| 1,364,407 | 1/1921 | Palmer et al. | 280/294 |

Primary Examiner—Kenneth H. Betts
Assistant Examiner—Jack D. Rubenstein
Attorney, Agent, or Firm—Ralph W. Kalish

[57] ABSTRACT

A support stand for bicycles comprising a rigid member formed from metal, such as sheet stock, rod stock, or the like, or from a suitable plastic, which is fixed upon a bicycle pedal and being swingable therewith about the related pedal axle or crank arm. The major portion of the stand extends rearwardly of the related pedal when the latter is in its normally operative disposition, substantially planarwise parallel to the support surface for creating a moment about the said axle to cause the pedal to automatically swing upon release of the user's foot for presenting the stand downwardly for ground engagement. The distance between the rearward edge of the pedal and the rearward edge or base of the stand is less than the distance between such pedal edge and the support surface when the bicycle is upright.

16 Claims, 19 Drawing Figures

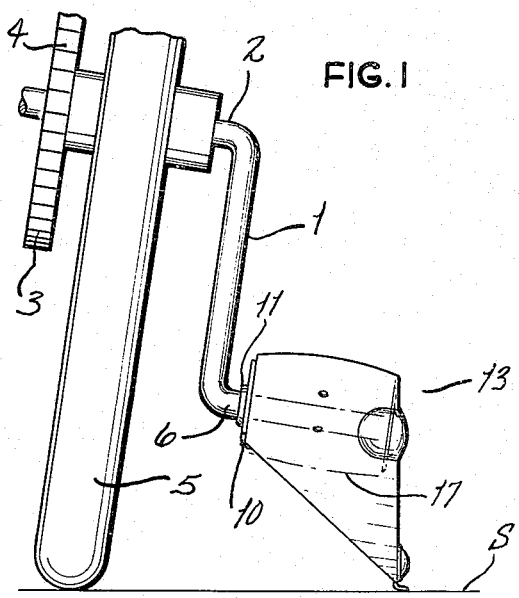
FIG. 1
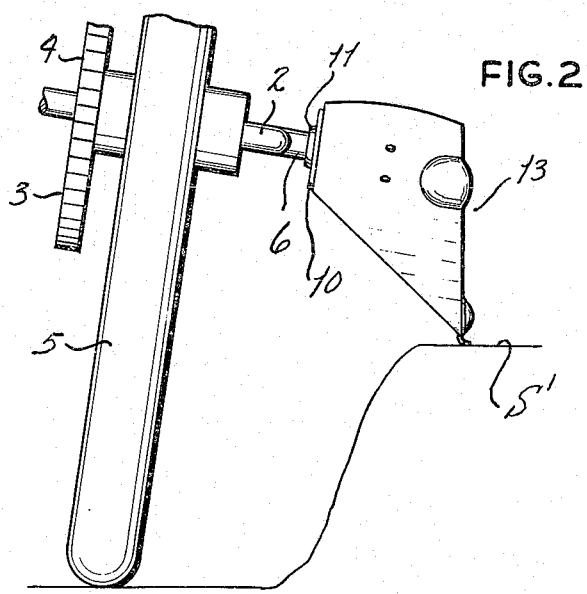
FIG. 2
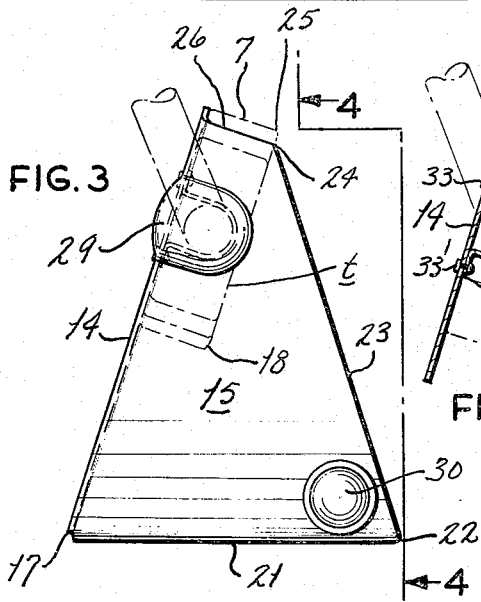
FIG. 3
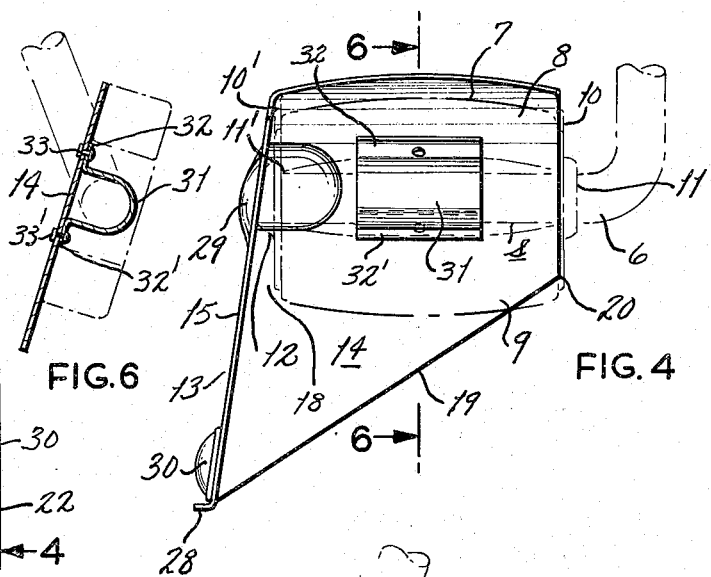
FIG. 4
FIG. 6
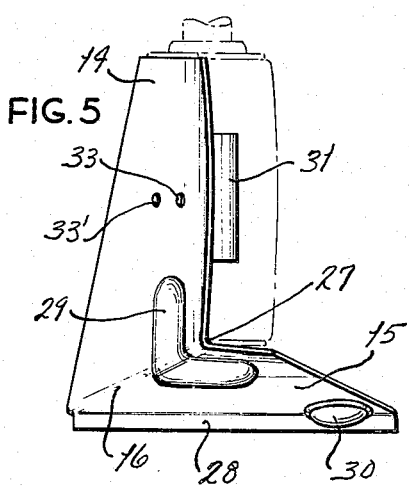
FIG. 5
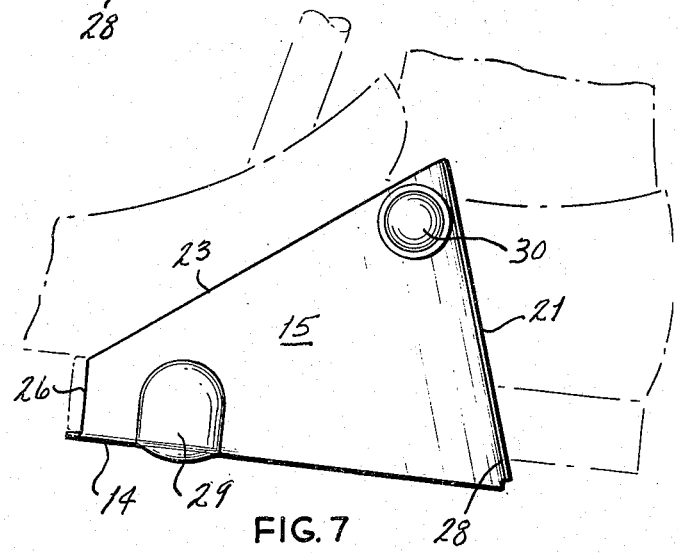
FIG. 7

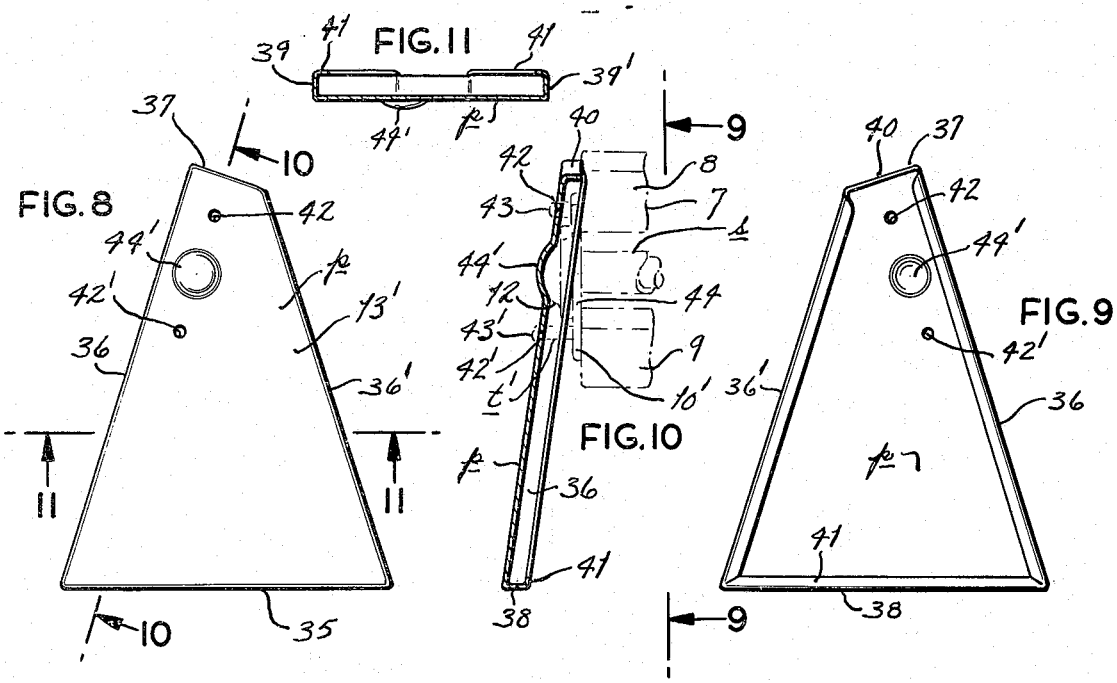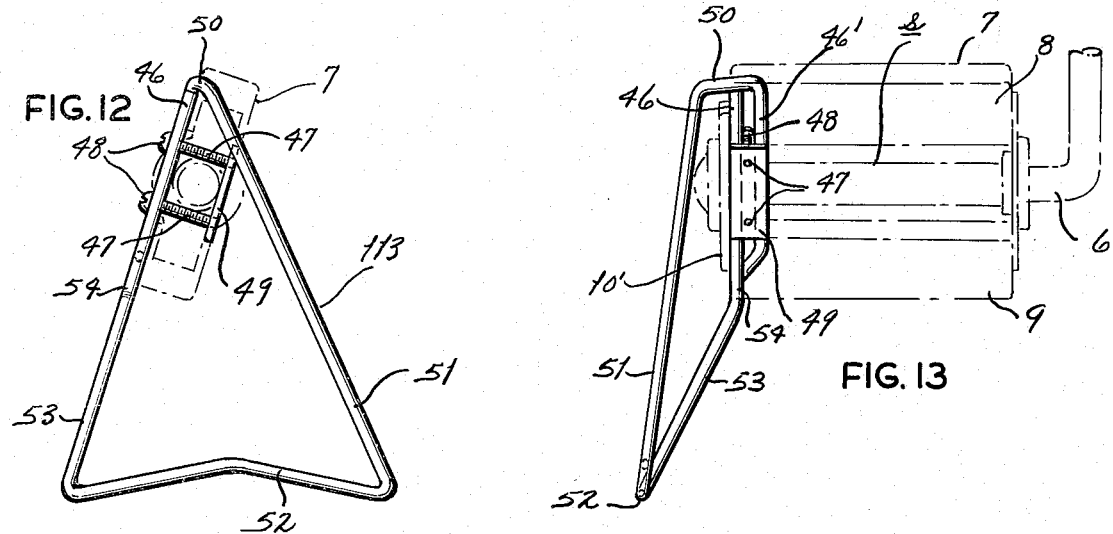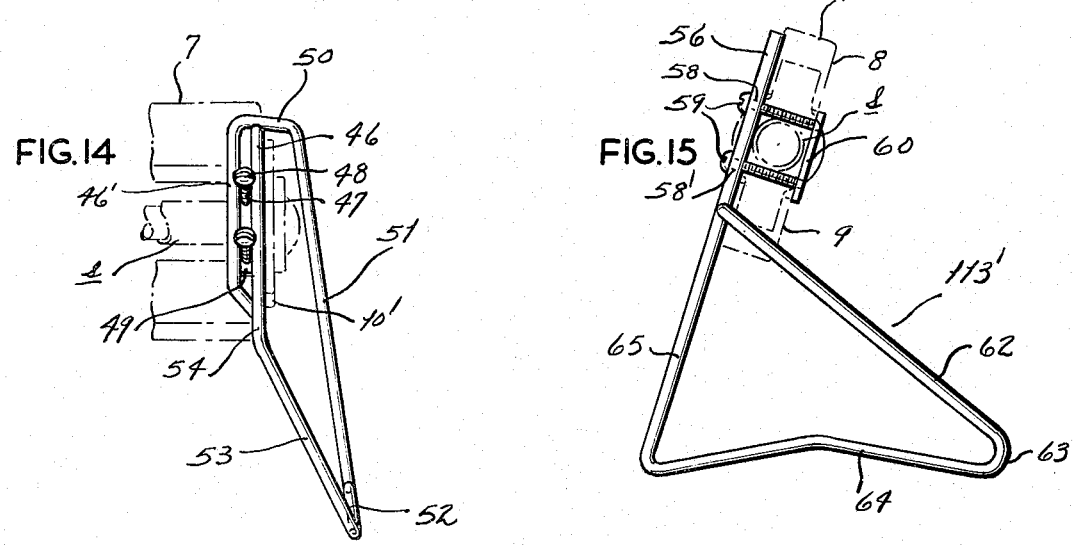

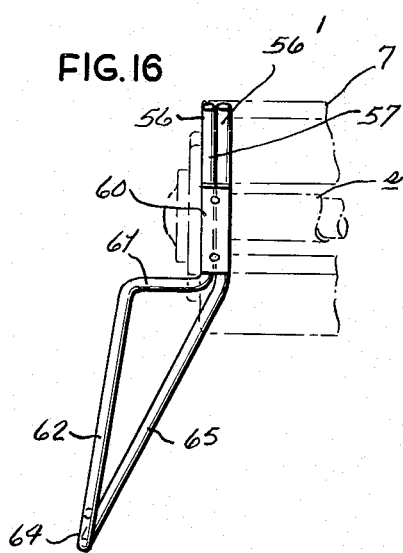
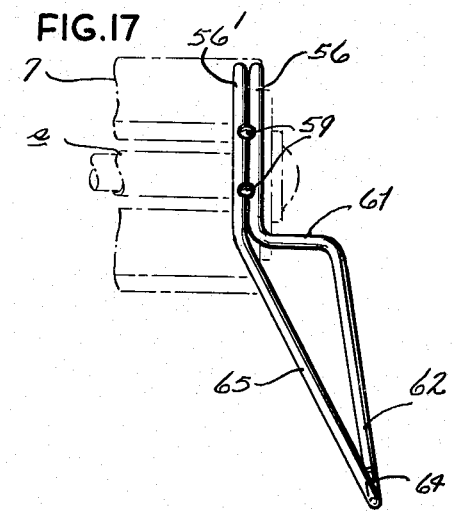
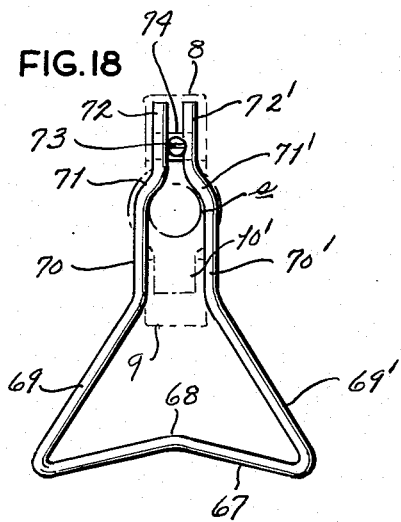
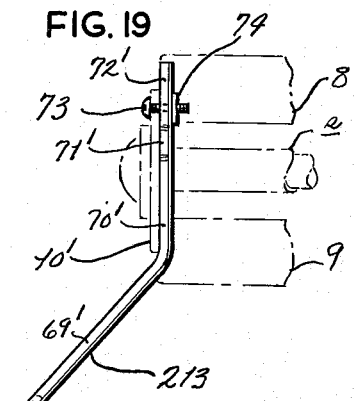

3,877,726

BICYCLE SUPPORT STAND

BACKGROUND AND SUMMARY OF THE INVENTION

This invention relates in general to bicycles and, more particularly, to a support stand therefor.

Heretofore various efforts have been undertaken to provide bicycles with devices for supporting same in substantially upright position when in disuse. Such prior attempts have included structures requiring the rider to effect movement of a primary support element between operative, ground-engaging condition and elevated, or inoperative position. Since such devices are manipulated primarily by the rider's foot, the same have been referred to generally as "kick stands." Thus, the action of said prior efforts has not been automatic, but has necessitated a forceful swinging of the support element, such as an arm, between its two positions. Certain of these devices have been fixed at a specific location upon the bicycle frame so that the same are useful in only a predetermined relationship to the support surface, such as ground level; there being no capacity for supporting the bicycle upon an incline or by means of a support surface which might be elevated above ground level. The prior art also discloses support devices which have been adapted for detachable engagement upon a bicycle pedal, being thus portable in character against potential use; while other pedal-connected supports have been of movable nature, requiring manipulation by the user for movement between operative and inoperative position.

Therefore, it is an object of the present invention to provide a bicycle support stand which does not necessitate operation by the rider for disposition into either operative or inoperative position, but which automatically moves between said positions consequent to the use or disuse of the bicycle.

It is another object of the present invention to provide a bicycle support stand which is of unitary construction having no moving components so that the same is resistant to breakdown and does not require periodic lubrication.

It is a further object of the present invention to provide a bicycle support stand of the character stated which is adapted for application upon existing structures without requiring modification thereof; which is of extremely lightweight; and which can be used on various size bicycles, thereby substantially eliminating inventory problems as have existed heretofore with kick stands which must be of appropriate size for each height of bicycle.

It is another object of the present invention to provide a bicycle support stand of the type stated which may be most economically manufactured; which may be made from a variety of materials of construction such as metal, plastic, and the like; which is extremely reliable in usage; and the use of which permits of stable support of the bicycle regardless of the character of the particular terrain or of the stand-accepting surface.

BRIEF DESCRIPTION OF THE DRAWINGS

FIG. 1 is an elevational view of a portion of a conventional bicycle having a support stand mounted thereon which is constructed in accordance with and embodying the present invention; said stand being illustrated in operative position with respect to a support surface.

FIG. 2 is an elevational view but showing the support stand in operative position upon a surface elevated above ground level.

FIG. 3 is an end view taken on the right hand side of FIG. 1, but illustrating the stand as the same immediately approaches contact with the support surface.

FIG. 4 is a rear elevational view of the support stand as illustrated in FIG. 3, being taken along the line 4—4.

FIG. 5 is a top plan view of the structure illustrated in FIG. 3.

FIG. 6 is a vertical transverse sectional view taken on the line 6—6 of FIG. 4.

FIG. 7 is a side view but illustrating the stand in inoperative position, with the associated pedal being disposed for cycling.

FIG. 8 is an end elevational view, as taken upon the right hand side of FIG. 1, but illustrating another form of the support stand constructed in accordance with and embodying the present invention; said stand being shown in operative position.

FIG. 9 is an elevational view taken substantially on the line 9—9 of FIg. 10 for showing the normally inner side of the stand.

FIG. 10 is a vertical transverse sectional view taken on the line 10—10 of FIG. 8 showing the related portions of the pedal in phantom lines.

FIG. 11 is a horizontal transverse sectional view taken on the line 11—11 of FIG. 8.

FIG. 12 is an end elevational view taken substantially on the right hand side of FIG. 1 but illustrating a further form of support stand constructed in accordance with and embodying the present invention; said stand being shown in operative position.

FIG. 13 is a rear elevational view of the support stand illustrated in FIG. 12 showing the related portions of the pedal in phantom lines.

FIG. 14 is a front elevational view of the support stand shown in FIG. 12.

FIG. 15 is an end view taken substantially on the right hand side of FIG. 1 but illustrating a still further form of support stand constructed in accordance with and embodying the present invention; said stand being shown in operative position.

FIG. 16 is a rear elevational view of the stand shown in FIG. 15, with the adjacent portions of the pedal being shown in phantom lines.

FIG. 17 is a front elevational view of the stand shown in FIG. 15.

FIG. 18 is an end view taken substantially on the right hand side of FIG. 1, but illustrating another form of support stand constructed in accordance with and embodying the present invention; said stand being shown in operative position.

FIG. 19 is a rear elevational view of the support stand shown in FIG. 18.

DESCRIPTION OF PRACTICAL EMBODIMENTS

Referring now by reference numerals to the drawings which illustrate practical embodiments of the present invention; 1 designates a crank formed with a customary crank axle 2 of a conventional bicycle, which axle is engaged to the usual driver sprocket 3 connected by a chin 4, or the like, to a driven sprocket (not shown) upon the rear wheel (not shown) of the bicycle. The front wheel of the bicycle is indicated fragmentarily by the reference numeral 5. It will be appreciated that a crank 1 is provided at both ends of crank axle 2 with each having a crank arm 6 at its lower end; the same being sometimes referred to as a pedal axle. Carried upon each crank 1 is a foot pedal 7 which may be of any suitable design, such as incorporating normally front and rear foot-engaging bars 8, 9 customarily of limited resilient character, as being formed of hard rubber or the like, and being axially parallel with and spaced from the intervening crank arm 6. Said bars 8, 9 are mutually interengaged at their ends by plates 10, 10'; said latter being provided with central registering openings to define bearings 11, 11', respectively, within which the end portions of the related crank arm 6 are journalled. A dome-like finial 12 may be provided on the outer face of end plate 10', aligned with bearing 11' for accepting the proximate end extremity of the related crank arm 6. Encasing crank arm 6 between plates 10, 10' may be a sleeve s. It should be understood that the particular character of pedal 7 is for purposes of exposition only since there are a variety of pedal styles currently available which are of the same general nature but which may vary to limited extents. Thus, the pedal structure per se is not a part of the present invention.

A bicycle support stand, indicated generally 13, is provided for affixation upon either pedal 7. In view of the fact that most riders mount upon, and dismount from, a bicycle on the left side, stand 13 is shown and described herein in association with the pedal 7 on the left hand side of the bicycle. Said stand 13 is fabricated of preferably metallic sheet stock, such as aluminum, and of suitable gage; being formed to present a normally front plate 14 as a considered when stand 13 is in bicycle supporting position (see FIG. 1), and a side plate 15, interconnected along a corner or line of bending 16, substantially coplanar with the bottom edges of bars 8, 9; the planes of said front and side plates 14, 15 being perpendicular along such corner 16. It is to be recognized that pedal 7 is freely swingable about crank arm 6; with the said bars 8, 9 being disposed substantially within a plane parallel to the ground or bicycle support surface during pedal operation, and being maintained therein by the user's foot; and being adapted for swinging within a vertical plane so as to present one bar above the other, as shown in FIGS. 3 and 4, which may be referred to as the pedal inoperative position. Accordingly, as stand 13 is rigid with pedal 7, the same will be rockable therewith between such positions, but being in reverse relationship in that when pedal 7 is in operative attitude, stand 13 will be inoperative and when pedal 7 is inoperative, stand 13 will be in its operative position. To facilitate orientation, stand 13 and all modifications hereinbelow will be described in relationship to pedal 7 when such stand 13 is in operative position.

Front plate 14 in its upper portion is substantially coextensive with the confronting, normally under surface of pedal 7. However, forward plate 14 projects below the normally rearward edge, as at 17, of pedal 7, as well as diverging laterally outwardly of plate 10', as at 18; having a bottom margin 19 progressing from the lower end of corner 16 upwardly and inwardly at a point immediately adjacent the normally rearward inner corner of pedal 7, as at 20. Side plate 15 is contoured to present a substantially truncated cone in profile having a base or normally bottom margin 21 presented spacedly downwardly from the normally rearward edge 17 of pedal 7 for ground or support surface engagement. Bottom margin 21 progresses from the lower end of corner 16 to a point, as at 22, spacedly rearwardly from a line passing through the rearwardmost point of pedal 7 and base 21 to accord stand 13 in adequate extent of support contact. Plate 15 incorporates a rearward side 23 upwardly and forwardly inclined from point 22 for termination at a point 24 proximate the upper rearward corner of pedal 7, as at 25; there being short top margin 26 extending between said side 23 and the upper end of the corner 16. As may best be seen in FIG. 4, side plate 15 inclines laterally outwardly toward margin 21 from pedal end plate 10'. An out-turned base flange 28 may be provided on base 21.

Embossed or otherwise formed on support stand 13 is a continuous protuberance 29 having a portion on the upper part of side plate 15 outwardly of finial 12 and continuing across the adjacent zone of corner 16 and into front plate 14 proximate thereto. Said protuberance 29 serves to accommodate finial 12, as well as substantially reinforce front and side plates 14, 15 thereby conducing to the strength of stand 13 without requiring increased weight. It will be appreciated that protuberance 29 is of suitable depth, contour, and extent so that the terminals or finials of substantially all current pedal structures may be easily accommodated.

The extent of stand 13 beyond edge 17 of pedal 7, as well as the normally upward surface thereof, as indicated at $t$, is such as to cause the center of gravity of stand 13 to provide a force for rocking the same together with pedal 7 in a clockwise direction, as viewed in FIG. 3, when said pedal is in operative position. However, if desired, for enhancing the force of the moment, a counterweight 30 may be provided in the lower rearward portion of stand 13 proximate point 22; said counterweight 30 being of any desired character but taking the form of a customary reflector button, if desired.

Although there are numerous methods whereby stand 13 may be mounted upon pedal 7, the drawings in FIGS. 1–7, inclusive, show one manner of securement which comprises a bearing plate 31, as of U-shape in cross section, for disposition about crank arm 6 and having flanges 32, 32' for engagement to front plate 14, as by rivets or other fasteners, indicated at 33, 33', respectively. Thus, bearing plate 13 is disposed within the spaces between bars 8, 9 and crank arm 6.

From the foregoing, the use of support stand 13 should be apparent. As pointed out above, the configuration of stand 13 provides a substantial portion normally rearwardly of pedal 7 when the same is in operative position so that when the user's foot is removed, stand 13, together with pedal 7, will rock about crank arm 6 to direct base 21 into supporting attitude. Counterweight 30, as in the embodiment shown in FIGS. 1–7, assures of appropriate driving force in the event the material of construction of stand 13 is a relatively light. Side plate 15 extends beyond the proximate margin of pedal 7 so that when stand 13 is in downwardly swung position, and the bicycle is upright, bottom margin 21 will be slightly spaced above the ground or support surface; such spacing being desirably within the range of an inch or so. In order to place the bicycle in a position of stable rest, the same must be canted to bring margin 21 into contact with the support surface. When the user desires to operate the bicycle, merely rocking same into vertical or upright position will automatically remove stand 13 from engagement with the support surface. Whenever the user discontinues the cycling action and removes his foot from pedal 7, as upon dismounting, said pedal 7 will be automatically rocked to dispose stand 13 for operation. Manifestly, the associated crank 1 must be in such position as to cause stand 13 to be brought into requisite relationship with the support surface. As shown in FIG. 1, when stand 13 is to engage the same surface as that upon which the bicycle rests, crank 1 must be in substantially vertical position. Whereas, when it is desired to present stand 13 upon an elevated support surface S', that is, one above that upon which the bicycle rests, crank 1 must be appropriately positioned, such as in horizontal disposition as suggested in FIG. 2.

The slight outward inclination of stand 13 from the outer side of pedal 7 reduces the degree of cant or tilt required for disposing the bicycle in a position of rest, as well as enhancing stability.

It will be seen that stand 13 is located sufficiently laterally outwardly of pedal 7 so that no untoward interference is caused the rider in placing his foot upon pedal 7 for cycling action or removing same therefrom.

From the foregoing it is manifest that support 13 may be economically manufactured and easily secured upon existing pedal constructions. Being devoid of any moving parts, stand 13 is resistant to breakdown, being reliable and durable in use; and foremost does not necessitate any action on the part of the rider for disposing same in supporting position or in returning same therefrom.

Turning now to FIGS. 8-11, inclusive, another form of bicycle support stand 13' is shown which is designed for mounting upon a bicycle pedal which, for facility of description, is of the same character as pedal 7 hereinabove described so that like reference numerals will be used on the components thereof. Support stand 13' is unitarily fabricated from sheet stock and constitutes but a single plate p conforming substantially to side plate 15 of stand 13 above described and constitutes a base or bottom margin 35, forward and rearward edges 36, 36' which incline upwardly and inwardly (as determined when stand 13' is in operative position) in a converging manner, and are interconnected at their upper ends by a relatively short, slightly downwardly inclined top margin 37. Forward edge 36 is substantially aligned with the normally outer bottom edge of pedal 7 and top margin 37 will be similarly in registering relationship with the normally outer vertical edge of pedal 7. For strengthening purposes, base 35, forward and rearward edges 36, 36', and top margin 37 are provided with side flanges, as at 38, 39, 39', 40, respectively, each of which latter, with the exception of flange 40, is turned in on its rearward edge to provide a lip, as at 41, substantially planarwise parallel to plate p. Plate p is provided in its upper portion with a pair of vertically spaced aligned openings 42, 42' being formed on a line substantially parallel to forward edge 36 for receiving screws or like fasteners 43, 43' engageable at their inner ends within openings provided in a mounting plate 44, the openings in which latter are aligned with openings in plate 10' (not shown). Screws 43, 43' carry spacers, as at t', of different length so that the plane of plate p may be inclined outwardly toward its lower end from the plane of end plate 10'. A protuberance 44' is formed in plate p to provide clearance for final 12.

Thus, stand 13', although being formed of sheet stock, is of relatively simpler construction than stand 13 hereinabove described, and by virtue of its flange and lip formations is strong and resistant to distortion during usage. Stand 13' operates in the same manner as stand 13 above described in that its center of gravity is located upwardly and rearwardly of pedal 7 when the latter is in horizontal position so as to cause same to be swung when pressure is removed therefrom for causing stand 13' to be presented for bicycle support relationship upon canting or tilting of the bicycle.

FIGS. 12, 13 and 14 disclose another form of bicycle support stand, indicated 113, for mounted disposition upon a bicycle pedal which latter is of the same construction as pedal 7 hereinabove described so that the components hereof will bear like reference numerals. Stand 113 is fabricated from a single continuous length of rod stock of suitable diameter having its opposite end portions 46, 46' presented in immediate axial parallel relationship and disposed against the normally under face of pedal 7 proximate end plate 10'; said end portions being spaced apart for extension therebetween of the stems 47 of a pair of screws 48 which progress through pedal 7 on opposite sides of sleeve s for engagement at their opposite ends within a bracket 49 disposed between bars 8, 9.

End portion 46' proximate the normally forward edge of bar 8 contains a short outwardly directed section 50 and is thence turned downwardly and rearwardly to define an elongated rearward leg 51 which, at its lower end spacedly rearwardly and downwardly of the normally rearward end of pedal 7 is continuous with a forwardly extending base 52; said latter at its opposite end being continuous with a forward leg section 53 which progresses upwardly, as well as inwardly, toward the plane of the adjacent side face of pedal 7 and merges into end portion 46 substantially at the rearward edge of pedal 7, as at 54. Base 52 for strengthening purposes is of slightly inverted V-configuration.

As thus viewed in FIG. 12 in outline, legs 51, 53, together with the intervening base 52, form a sturdy support for the bicycle. As noted in FIG. 14, legs 51, 53 are not planarwise aligned and thereby give added strength to stand 113. The material of construction of stand 113 is of sufficient weight so as to constitute a force eccentric to the axis of the related crank arm 6 to assure of automatic swinging of the associated pedal 7 upon dismounting of the rider. It is readily observed that the mounting of stand 113 upon pedal 7 is easily and quickly achieved requiring no modification of the pedal so that the same is adapted for ready use with current bicycle pedal constructions.

FIGS. 15 and 16 disclose a still further form of bicycle stand indicated at 113' which may be mounted upon a bicycle pedal if desired. Here again, the components of the pedal will bear like reference numerals as pedal 7 hereinabove described. Stand 113' is also formed from a continuous length of suitable rod stock having its opposite end portions 56, 56' in side by side, axially parallel abutting relationship and being preferably brazed, soldered, or otherwise united to cooperate in forming a mounting section 57 having a pair of spaced openings 58, 58' drilled or otherwise formed therein for extension therethrough of screws 59, the opposite ends of which are threadedly engaged within tapped openings (not shown) in a bracket 60 abutting against the opposite, or normally upper, faces of bars 8, 9 from that against which mounting section 57 is disposed. Screws 59 thus pass within the spacings between bars 8, 9 and sleeve s. End portion 56 at its lower end immediately beneath the normally outer rearward edge of pedal bar 9 is turned laterally outwardly to form an arm 61 which terminates spacedly beyond the plane of end plate 10' and thereat is bent to present a rearwardly and downwardly extending leg 62. Leg 62 terminates rearwardly and below the normally upper face of pedal 7, as at a point 63, determining the rearward extremity of a base section 64, said latter progressing forwardly to a point where the rod stock is then bent upwardly and rearwardly defining a forward leg 65 which also is directed inwardly (see FIG. 17) for merging into the normally lower end of end section 56'. It will thus be seen that legs 62, 65 cooperate with base 64 to form a sturdy support; said base 64 being of slightly inverted V-form for regidification purposes. Thus, support stand 113' operates in the same manner as stands 13, 13' and 113 above described, being of unitary construction and easily mounted on substantially all pedal constructions.

If desired, a still further form of support stand 213 for bicycles may be provided and being illustrated in FIGS. 18 and 19. This particular form of the present invention may also be fabricated from a single continuous length of metal rod stock and is of substantially symmetrical character embodying a base 67 which extends rearwardly of the normally rearward edge of the associated pedal 7, both above and below same, and has a central inverted V configuration, as at 68, for strengthening purposes. At each of its ends, base 67 is bent to form forward and rearward legs 69, 69', respectively, which extend upwardly and inwardly in converging fashion toward the normally lower and upper rearward edges of end plate 10'. As will be observed in FIG. 19, said legs 69, 69' also are directed laterally inwardly toward the plane of end plate 10' so as to present base 67 laterally outwardly thereof. Each leg 69, 69' is continuous with an upper section 70, 70', respectively, which are substantially paralle, being presented immediately inwardly of plate 10' in substantially planar parallel relationship therewith. Each upper section 70, 70' progresses on opposite sides of sleeve s immediately adjacent opposite portions thereof, and are thence curved inwardly toward each other as at 71, 71', respectively, and therefrom are provided with short axially parallel end portions 72, 72', respectively, which are received inwardly of plate 10' and immediately outwardly of the confronting end surface of pedal bar 8. A screw or other fastener 73 extends through an opening in end plate 10' and between end portions 72, 72' for engagement within a mounting plate 74 provided against the inner face of said end portions 72, 72'.

Thus, support stand 213 discloses another readily formed support stand for fixed engagement upon a bicycle pedal and with its configuration and weight distribution being such as to urge the related pedal 7 downwardly upon pedal disuse for presenting base 67 for support surface contact in the manner above described.

The foregoing modifications of this invention are simply exemplary of the myriad possible stands that may be constructed embodying the present invention. This stand is thus devoid of any movable parts so that no operation is required by the user for urging the stand into supporting position. Furthermore, the stands of this invention can be easily mounted on pedal constructions by the average bicycle user.

From the foregoing the fundamentals of the operation of the combined pedal 7 and stand are obvious in that the same constitute a single body wherein the center of gravity is offset from a vertical line passing through the pivot axis of the pedal so that an unstable equilibrium is established. When the user removes his foot the center of gravity will move downwardly into potentially operative position. It is, of course, obvious that if the stand were to project forwardly from the pedal instead of rearwardly as shown herein, the operation would be the same in that it would move to downward position automatically upon withdrawal of the force of the user's foot. However, with the rearward disposition of the stand as shown in the various modifications herein, the same is removed from inadvertent contact with obstacles along the rider's path as well as provides limited protection to the side of the user's foot.

I claim:

1. In combination with a bicycle pedal for receiving a user's foot for cycling action having normally front and rearward bars having inner end portions proximate the related bicycle and outer end portions laterally outwardly of the related bicycle, inner and outer side plates connecting said front and rearward bars, there being a crank arm extending between said side plates in axial perpendicular relationship thereto to define a pivot axis for said pedal for rotation thereabout between operative, pedaling position wherein said pedal is in substantially horizontal disposition, and inoperative, resting position wherein said pedal is presented in substantially vertical disposition, a rigid support stand rigidly and non-foldably fixed on said pedal for rotation therewith about said axis of said crank arm and being located laterally outwardly with respect to the portion of said pedal receiving the user's foot, said support stand projecting laterally outwardly and downwardly of said outer side plate when said pedal is in in-operative, resting, substantially vertical position, and projecting laterally outwardly and endwise of said outer side plate beyond one of said front and rearward bars when said pedal is in operative, pedaling, substantially horizontal position, said support stand being asymmetrical with respect to said pedal when the latter is in substantially horizontal operating position, said stand being of such shape and weight that the center of gravity of the combined pedal and stand is offset from a vertical plane passing through said crank arm pivot axis so as to normally urge said pedal into inoperative, resting, substantially vertical position.

2. The invention as defined in claim 1 and further characterized by the major dimension of said support stand being less than the distance between the lowermost portion of the pedal when the latter is in inoperative, resting, substantially vertical position, and the bicycle support surfaces with said bicycle upright.

3. The invention defined in claim 1 and further characterized by said support stand extending beyond the rearward bar when said pedal is in operative, pedaling, substantially horizontal position.

4. The invention defined in claim 1 and further characterized by said support stand extending beyond the forward bar of said pedal when the latter is in operative, pedaling, substantially horizontal position.

5. The invention defined in claim 1 and further characterized by said support stand having a base portion for engaging a support surface when said pedal is in inoperative, resting, substantially vertical position with said bicycle in canted position, with said base portion being presented forwardly of said forward bar of said pedal when the latter is in operative, pedaling, substantially horizontal position, and opposed side portions extending between said base portion and said pedal.

6. The invention as defined in claim 1 and further characterized by said support stand having a base edge for engaging a support surface when said pedal is in inoperative, resting, substantially vertical position with said bicycle in canted position, said base edge being presented rearwardly of said rearward bar of said pedal when the latter is in operative pedaling, substantially horizontal position, there being opposed side edges extending between said base edge and said pedal.

7. The invention as defined in claim 6 and further characterized by said side edges being in converging relationship toward said pedal so that said base edge constitutes the maximum transverse extent of said support stand.

8. The invention as defined in claim 7 and further characterized by said support stand being fabricated of sheet material and having a base flange.

9. The invention as defined in claim 8 and further characterized by a counterweight being provided on said member proximate its base edge.

10. The invention as defined in claim 7 and further characterized by said support stand being fabricated of rod stock defining the said base portion and side portions which latter extend convergingly toward said pedal, said side portions having end portions remote from said base portion, and means for engaging said end portions of said side portions upon said pedal on its outer side plate.

11. The invention as defined in claim 8 and further characterized by said support stand including a front plate, and means engaging said front plate against the normally under portion of said pedal when the same is considered in operative, pedaling, substantially horizontal position.

12. For use with a bicycle having a frame, a crank axle, means rotatably mounting said crank axle on said frame, front and rear wheels, means operatively connecting said crank axle and at least one of the said wheels, a crank arm engaged to said crank axle, a pedal for receiving a user's foot for cycling action having normally front and rearward bars, said latter having inner end portions proximate the related bicycle and outer end portions laterally outwardly of the related bicycle, said pedal also having inner and outer side plates connecting said bars, said crank arm extending between said side plates in axial perpendicular relationship thereto to define a pivot axis for pedal rotation thereabout between operative, pedaling position wherein said front bar is presented forwardly and said pedal is substantially horizontal, and inoperative, resting position wherein said front bar is presented substantially upwardly with said pedal being in substantially vertical disposition, the improvement comprising a rigid unitary support stand for said bicycle for engaging a support surface rigidly and non-foldably fixed on said pedal for rotation therewith about said axis developed by said crank arm and being located laterally outwardly with respect to the portion of said pedal receiving a user's foot, said stand projecting laterally outwardly and downwardly of said outer side plate when said pedal is in operative, resting, substantially vertical position, and projecting laterally outwardly and endwise of said outer side plate beyond one of said front and rearward bars when said pedal is in operative, pedaling, substantially horizontal position, said stand being of such shape and weight that the center of gravity of the combined pedal and stand is offset from the vertical plane passing through said crank arm pivot axis so as to urge said pedal into inoperative, resting, substantially vertical position.

13. The improvement as defined in claim 12 and further characterized by said support stand having first and second plate portions, said first plate portion being normally disposed against the under face of said pedal when the same is considered as in operative, pedaling, substantial horizontal position, said first and second plate portions being interconnected.

14. The improvement as defined in claim 13 and further characterized by said second plate portion being planarwise outwardly inclined with respect to the outer side plate when said pedal is in inoperative, substantially vertical position.

15. The improvement as defined in claim 12 and further characterized by said support stand extending rearwardly beyond the rear bar of said pedal when the latter is in operative, pedaling, substantially horizontal position so that said support stand and the pedal will swing downwardly and forwardly into inoperative, resting, substantially vertical disposition when the user's foot is removed therefrom.

16. The improvement as defined in claim 12 and further characterized by said support stand extending forwardly of the forward bar of said pedal when the latter is in operative, pedaling, substantially horizontal position so that said stand and the pedal will swing downwardly and rearwardly into inoperative, resting, substantially vertical disposition when the user's foot is removed from said pedal.

* * * * *

UNITED STATES PATENT OFFICE
CERTIFICATE OF CORRECTION

PATENT NO. : 3,877,726

DATED : April 15, 1975

INVENTOR(S) : Edwin E. Foster

It is certified that error appears in the above-identified patent and that said Letters Patent are hereby corrected as shown below:

Col. 9, Claim 12, line 14, "operative" should be ---inoperative---.

Signed and sealed this 15th day of July 1975.

(SEAL)
Attest:

RUTH C. MASON
Attesting Officer

C. MARSHALL DANN
Commissioner of Patents
and Trademarks